United States Patent [19]

Lennington et al.

[11] 4,101,767

[45] Jul. 18, 1978

[54] DISCRIMINATING FIRE SENSOR

[75] Inventors: John W. Lennington, Bellville; Donald M. Szeles, Ann Arbor, both of Mich.

[73] Assignee: Sensors, Inc., Ann Arbor, Mich.

[21] Appl. No.: 798,801

[22] Filed: May 20, 1977

[51] Int. Cl.[2] .................... G01J 1/00

[52] U.S. Cl. .................... 250/339; 250/340; 250/349

[58] Field of Search .................... 250/338, 339, 340, 349; 340/228 R

[56] References Cited

U.S. PATENT DOCUMENTS

| | | | |
|---|---|---|---|
| 3,147,380 | 9/1964 | Buckingham et al. | 250/338 |
| 3,825,754 | 7/1974 | Cinzori et al. | 250/338 |

*Primary Examiner*—Davis L. Willis

*Attorney, Agent, or Firm*—Price, Heneveld, Huizenga & Cooper

[57] ABSTRACT

A discriminating fire sensor includes detecting means which discriminates between hydrocarbon fires desired to be detected and high-energy exploding rounds of ammunition without causing a hydrocarbon fire. Also, the system distinguishes between a hydrocarbon fire desired to be detected and ambient radiation in order to prevent false alarms. Circuit means coupled to the detecting means provide an output control signal for the activation of a fire suppressant only when a hydrocarbon fire is detected having predetermined properties to exclude false alarms.

20 Claims, 27 Drawing Figures

0
1
2
A
3
4
5
6
TIME - MILLISECONDS

A
B
C
0
5
10
15
20
50
60
TIME-MILLISECONDS

0
A
5
10
15
20
25
30
TIME - MILLISECONDS

DISCRIMINATING FIRE SENSOR

BACKGROUND OF THE PRESENT INVENTION

This invention relates generally to fire and explosion detection systems and more particularly to a discriminating system for the prevention of false alarms.

Fire detection systems which respond to the presence of either a flame or an explosion for generating an output control signal used for activation of a fire suppressant are generally known. Typical of such systems is a sensor for determining the existence of radiation at a wavelength corresponding to $CO_2$ emission which is characteristically associated with a hydrocarbon fire.

In military applications it is desirable to discriminate against a hydrocarbon fire which can be produced by, for example, the explosion of a fuel tank in vehicles such as armored personnel carriers or tanks and high energy "High Energy Anti-Tank" (HEAT) rounds. HEAT rounds cause momentary high-energy radiation levels and high temperatures ($>$ 3000° K. and often $>$ 5000° K.) due not only to the ammunition round itself but due to a secondary reaction with the vehicle's armor theorized as a pyrophoric reaction. HEAT rounds may or may not, however, set off a hydrocarbon fire. Thus, it is desired to prevent activation of a fire suppressant where a HEAT round enters a vehicle but does not explode the fuel tank and does not cause a fire.

U.S. Pat. No. 3,825,754 issued July 23, 1974 to Cinzori et al. discloses a detecting system which includes sensing means for specifically detecting a HEAT round and responding to the detection of such a round to deactivate the hydrocarbon fire detecting means of the system for a period of time. If after the delay period a hydrocarbon fire is detected, the fire suppressant will be activated. A significant disadvantage with prior art of this type is that during the delay period an explosive hydrocarbon fire can be well underway before the system detects it and actuates the suppressant. Thus there is a need for an improved discriminating fire detecting system which although providing the desired discrimination between HEAT rounds which do not cause a resultant explosive hydrocarbon fire and ones that do is not undesirably disabled for a delay period in which an explosive hydrocarbon fire can get out of control before the suppressant is activated.

SUMMARY OF THE PRESENT INVENTION

The present invention accomplishes this end by providing detecting means for providing an output signal only when a detected fire emission, regardless of its source, is such that the apparent temperature of the source is below a predetermined color temperature, which temperature is above the normal temperature of a hydrocarbon fire. Additional detecting means are provided for detecting the $CO_2$ emission of a hydrocarbon fire. Logic circuit means coupled to the detecting means process the output signals therefrom to provide a control output signal only in the event the radiant output content of the source meets predetermined spectral and time-varying criteria. Such a system responds very rapidly to a hydrocarbon fire and discriminates against HEAT rounds or other sources having an apparent temperature above the predetermined temperature and which do not cause a hydrocarbon fire within a predetermined period of time.

These and the other features and advantages of the present invention will become apparent upon reading the following description thereof together with the accompanying drawings in which:

DETAILED DESCRIPTION OF THE PREFERRED EMBODIMENT

Figure 1:
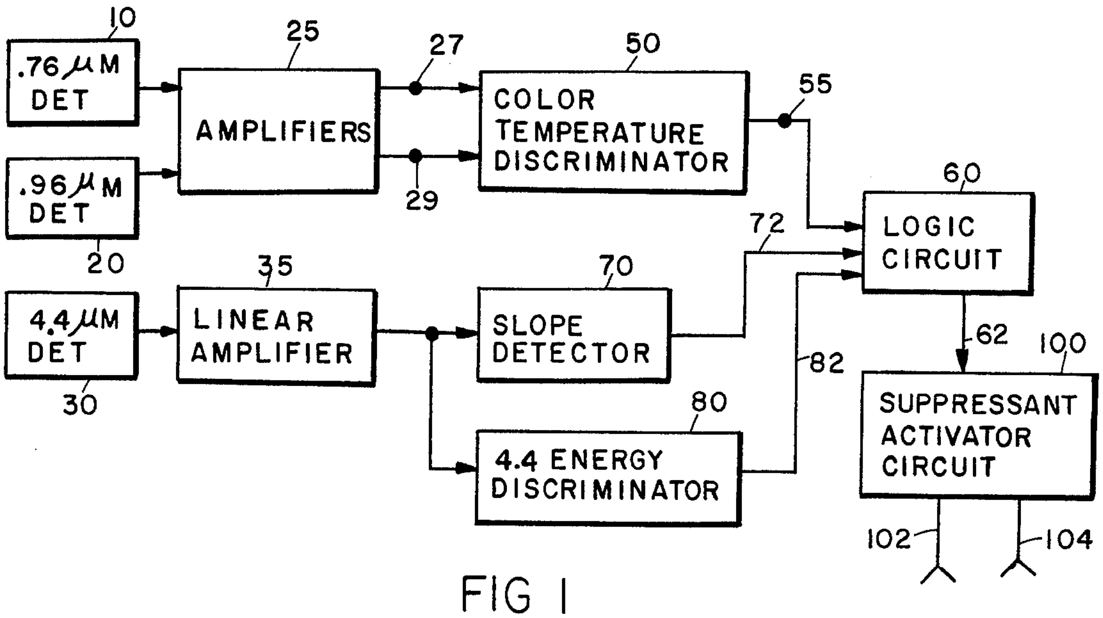
FIG. 1 is an electrical circuit diagram in block form showing the basic circuit components of the present invention.

Referring now to FIG. 1, the circuitry of the preferred embodiment is disclosed and includes a 0.76 micrometer detector assembly 10 which includes a commerically available silicon diode detector 12 (FIG. 3) and a filter 14 (FIG. 2) for transmitting radiation only within a narrow wavelength band centered at 0.76 micrometers into the field of view of diode 12. The output from detector assembly 10 is coupled to one input of amplifier circuit 25.

A second detector assembly 20 includes a second silicon diode 22 (FIG. 3) and a filter 24 (FIG. 2) mounted in the field of view of the diode 22 for passing into its sensing area radiation within a wavelength band centered at 0.96 micrometers. The output of detector assembly 20 is also coupled to an input of amplifier circuit 25.

A third detector assembly 30 includes a thermopile sensor 32 (FIG. 3) and a filter 34 (FIG. 2) mounted in its field of view such that radiation within a wavelength band centered at 4.4 micrometers only will strike the sensing surface of the thermopile detector 32. The output of detector assembly 30 is coupled to the input of a linear amplifier circuit 35.

Figure 2:
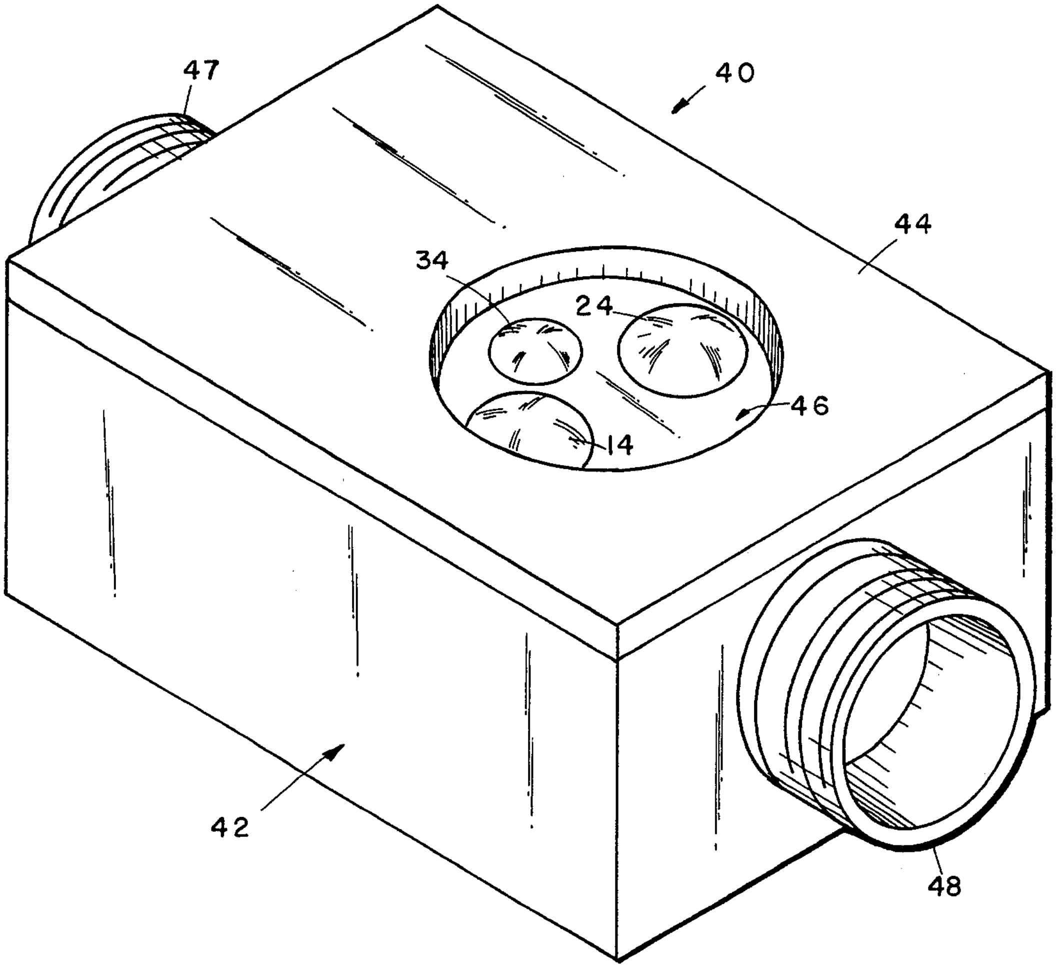
FIG. 2 is a perspective view of a sensing head used in a system embodying the present invention.

Each of the detector assemblies 10, 20 and 30 is mounted to a sensor head 40 shown in FIG. 2. The sensor head includes a generally rectangular housing 42 having a removable top 44 with a circularly recessed area 46 in which the triad of sensor assemblies 10, 20 and 30 is mounted. The filters 14, 24 and 34 are commercially available optical filters which are suitably mounted within the floor of recess 46 which provides some shielding, limiting the field of view of the detectors. The head thus monitors a desired area by appropriately mounting housing 40 with the detectors pointing toward the area to be monitored. Housing 40 also includes an input electrical connector 47 at one end and an output connector 48 at the opposite end such that a plurality of housings mounted at various locations, for example within a tank or armored personnnel carrier, can be serially interconnected. Conveniently, housing 40 may include amplifiers 25 and 35 as well as other of the electrical circuits associated with each of the sensor heads.

Returning now to FIG. 1, amplifiers 25 include a first output terminal 27 coupled to one input of a color temperature discriminating circuit 50 and a second output terminal 29 coupled to another input of the color temperature discriminator circuit.

In order that they can be used with silicon detectors (which are inexpensive, rugged, relatively stable with varying temperature, etc.) the filters associated with detectors 10 and 20 were selected to have narrow and distinct pass bands within the range of 0.6–1.0 micrometers. The signals thus generated can be used for color temperature discrimination.

Maximum contrast in the ratio of the two generated signals as a function of changing graybody source temperature can be obtained if the two wavelength bands are spectrally separated as far as possible; in this case the bands would be chosen to be 0.6 and 1.0 micrometers. It is known, however, that the emission spectra of a hydrocarbon fire, an exploding shell and a probable pyrophoric reaction all exhibit extensive line structure at wavelengths less than 0.6 micrometers, and possibly some line structure between 0.6 and 0.7 micrometers. Since the color temperature discrimination process depends upon the radiation source behaving as a graybody continuum, the optical filter bands should be chosen such that neither is coincident with emission line structure. It is quite certain that no line structure exists between 0.75 and 1.0 micrometers, so the two wavelength bands were chosen to approximately match the extremes of this wavelength region.

As to the color temperature discrimination process itself, it is true that the ratio of spectral energy from a graybody source falling in a narrow wavelength band centered at 0.96 micrometers divided by that falling in a narrow wavelength band centered at 0.76 micrometers varies significantly with source temperature within the range of 1000° K.–4000° K., and, thus, can be used for discriminating between source temperatures above and below a predetermined temperature of, say, 2400° K. This predetermined temperature, 2400° K., is well above the normal temperature of a typical hydrocarbon fire and well below the temperature of a HEAT round and/or an associated pyrophoric reaction. It is also well below the temperature of many potential false alarm sources (the sun, incandescent and fluorescent lights, arc-welders, lightening, etc.).

It was found, for example, that the ratio of energy detected by detectors 20 and 10 at 2800° K. was approximately 1.61 while the ratio at 2100° K. was about 2.57. Similarly, the ratio of energy at 1600° K. increased to 4.62. Below 1600° K. the ratio of energy increases even further. At 1400° K., the energy ratio is about 6.57. Thus the output signals can be processed by the color temperature discriminating circuit 50 to provide at its output terminal 55 a signal in the form of a logic '1' or a logic '0' which in the preferred embodiment represents detected temperatures below or above 2400° K. respectively.

Thus by employing the ratio of energy detected by a pair of separate detecting means, an extremely accurate binary output signal can be generated for providing digital information to a logic circuit 60 for preventing activation of the fire detecting system in the event a source hotter than a typical hydrocarbon fire is detected by those parts of the system which are subsequently discussed. The practical application of this feature of the invention is that the system is immune to erroneous detection of HEAT rounds which do not cause secondary hydrocarbon fires within a predetermined time.

The remaining channel of the fire sensor circuit includes the 4.4 micrometer detecting assembly 30 which has the output of amplifier 35 coupled to a slope detector circuit 70 and also to an energy discriminator circuit 80. Slope detector 70 determines whether or not the intensity of the radiation at 4.4 micrometers (a CO2 emission wavelength) is increasing and if it is, provides a logic '1' output signal on conductor 72 which is applied to the input of logic circuit 60. A slope detector is employed since in the known military application, a fire must be detected and the suppressant activated within 5 milliseconds of shell impact if the personnel within the vehicle are to be protected from the fire. During the first 5 milliseconds, the fire will certainly be growing, so if it is required for a valid fire detection that the fire be growing at a rapid rate, then no potential false alarm source which does not also cause a rapid increase in radiant intensity upon the 4.4 micrometer detectors will actually cause a false alarm.

The energy discriminator circuit receives the input signal from amplifier 35 and ascertains whether or not the detected radiation has reached a predetermined threshold and provides a logic '1' output signal on conductor 82 applied to logic circuit 60 representative of this parameter.

Logic circuit 60 responds to the input signals from circuits 50, 70 and 80 and includes false alarm prevention circuitry for responding only to input signals representative of a fire having chosen characteristics to cause activation of the suppressant. In response to these signals, the logic circuit 60 provides an output signal applied to suppressant activator circuit 100 by means of an output conductor 62. The suppressant activator circuit 100 includes inputs 102 and 104 coupled to similar fire sensing heads and associated circuitry such that any one of a plurality of sensing heads can cause activation of the suppressant for extinguishing a fire. In some installations, a plurality of different spaced suppressant systems each including their own activator circuits will be employed. In other installations, it may be desirable to actuate all of the suppressants by a single control circuit.

Figure 3:
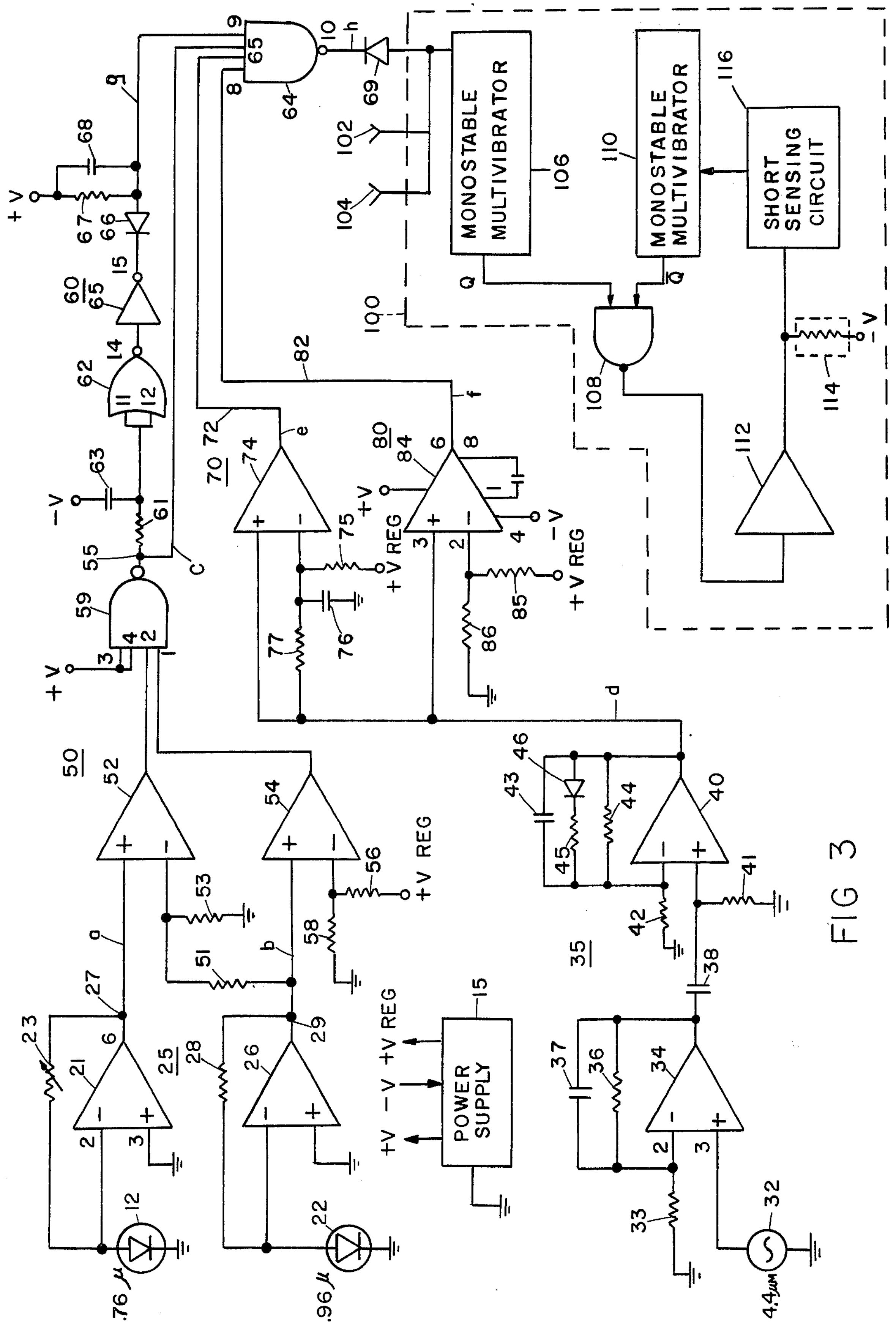
FIG. 3 is an electrical circuit diagram partly in block and schematic form showing the detailed construction of the preferred embodiment of the present invention.

Having briefly described the overall circuitry of the system and the sensing head including the three detection means, a detailed description of the individual circuits and their operation is now presented in conjunction with FIG. 3. In FIG. 3 elements which are identical to those previously described are identified by the same reference numerals.

In FIG. 3 silicon detector 12 has its cathode grounded and its anode coupled to input terminal 2 which is the negative input terminal of a differential operational amplifier 21 which has its positive input terminal grounded. A variable feedback resistor 23 coupled from output pin 6 of amplifier 21 is returned to input terminal 2 to control the transfer function of the amplifier. Similarly, silicon detector 22 has its cathode grounded and its anode terminal coupled to the negative input terminal of a second differential operational amplifier 26 with its positive input terminal grounded.

A fixed feedback resistor 28 couples the output terminal 29 of amplifier 26 to the negative input terminal for controlling its transfer function. Note that the transfer function of such an amplifier is:

$$(V_o/i_p) = R_f$$

where:

$V_o$ = amplifier output voltage $i_p$ = photodiode output current $R_f$ = feedback resistance The value of feedback resistor 28 is selected so that amplifier 26 will not be in saturation with the field of view of detector 12 completely filled with a 2100° K. source. Variable feedback resistor 23 is adjusted so that, with a 2400° K. source within the system field of view, the signals on the positive and negative terminals of comparator 52 are equal. As a result of this adjustment, if the amplifiers are driven into saturation, it is implied that the source temperature is above the maximum expected fire temperature (2100° K.), and so any fire detection should be prevented. The voltage divider composed of resistors 51 and 53, which have values of 24 K-ohm and 51 K-ohm, respectively, assure that if amplifiers 21 and 26 are in saturation, the signal on the positive input of comparator 52 will always be greater than that on the negative terminal. Thus, the output of comparator 52 is a logical '1'. Comparator 52 has this same logical output when a source within the field of view of the system exhibits a temperature in excess of 2400° K. Remember that the signals on the two inputs of comparator 52 are equal for a source temperature of 2400° K. For source temperatures in excess of 2400° K., the signal on the positive input of comparator 52 will be greater than the signal on the negative input, and the output of comparator 52 will be a logical '1'. Otherwise, except for the saturation condition described above, the output of comparator 52 will be a logical '0'.

The color temperature discriminator requires a logical '1' on input 2 as well as on input 4 of gate 59 in order to generate an inhibit signal on either input 5 or input 9 of gate 64. The logical '1' appears at the output of comparator 54 whenever the signal on line 29 exceeds a present threshold value established on the negative input of comparator 54 by +V reg and the voltage divider composed of the resistors 56 and 58. It is required that the signal of one of the channels, in this case the 0.96 micrometer channel, exceed some preset threshold in order that any inhibit signals be generated so that it is guaranteed that there is sufficient optical signal available to accurately determine whether the source temperature is above or below 2400° K. Real devices used in this circuitry will exhibit some error, and if the error is of the same order as the levels of the signals being processed, then the decision to inhibit the detection process could be an erroneous one. The threshold value on the negative terminal of comparator 54 is set to be at least one order of magnitude greater than the expected errors at the output of amplifiers 21 and 26. Thus, an inhibit signal (a logical '0' inhibiting gate 64) is generated on line 55 whenever the temperature of a source within the field of view of the sensor is measured to exceed 2400° K. and the signal in the 0.96 micrometer channel is sufficiently great that the binary source temperature determination is an accurate one. An inhibit signal is also generated on line 55 if amplifiers 21 and 26 are saturated.

In the preferred embodiment, amplifiers 21 and 26 were commercially available type RM 1556 AT integrated circuits, while comparators 52 and 54 were RM 1556 AT operational amplifiers being used as differential comparators.

In order to supply operating power to these amplifiers as well as to the remaining circuitry, a power supply 15 is provided and coupled to the circuits in a conventional manner. Power supply 15 provides both a +V and ground supply voltage as well as a +V reg regulated voltage for providing, as noted below, the voltage used for developing reference voltages employed in the system.

The signal from the thermopile detector 32, which detects carbon dioxide spectral radiation in the 4.4 micrometer wavelength band, is first amplified by operational amplifier 34 coupled in a conventional manner to be a non-inverting linear amplifier. Capacitor 37 is used to limit the amplifier bandwidth to that which is useable.

Coupling capacitor 38 couples the output signal of amplifier 34 to the positive input of amplifier 40, which is also configurated in a conventional way to act as a non-inverting amplifier. Again, capacitor 43 serves merely to limit the bandwidth of the amplifier. The part of the feedback loop comprised of resistor 45 and diode 46 is intended to provide a reduction in the voltage gain of amplifier 40 for signals whose voltage exceeds the forward voltage of the silicon diode. It is used to help prevent the saturation of amplifier 40. The output signal from amplifier 35 including differential amplifiers 34 and 40 is applied to the slope detector circuit 70 and to the input of the energy discriminator circuit 80. The slope detector 70 comprises a differential amplifier 74 having its positive input terminal directly coupled to the output of amplifier 40. The negative input terminal of amplifier 74 is coupled to the +V reg by means of resistor 75 thereby providing a positive voltage bias to the negative terminal. An RC integrator circuit consisting of a capacitor 76 coupled from the negative input terminal to ground and a resistor 77 serially coupled between the negative input terminal of amplifier 74 to the output of amplifier 40 serves to delay the input signal applied to the negative input terminal of differential amplifier 74 from amplifier 40.

Because of the positive bias on the negative input terminal of amplifier 74, the output of amplifier 74 will normally be a logic '0'. When, however, the signal from amplifier 40 is increasing at a predetermined rate, a larger amplitude signal applied to the positive input terminal will exceed the amplitude of the delayed lower amplitude signal plus the positive bias applied to the negative input terminal thereby causing the differential amplifier output to reverse and provide a logic '1' output. This occurs in the event the $CO_2$ emission of a fire is increasing at a predetermined slope. In the preferred embodiment the rate of increase was selected to detect an input voltage waveform with a rate increase of approximately 5-volts per second with the RC time constant of the delay circuit selected for approximately 1 millisecond delay. Thus capacitor 76 has a value in the preferred embodiment of 0.22 microfarads while resistor 77 has a value of 5.1 K-ohm.

The energy discriminator circuit 80 also includes a differential amplifier 84 having its positive input terminal coupled to the output of amplifier 40. Its negative input terminal is coupled to the junction of resistors 85 and 86 which are serially coupled from the +V reg supply to ground. Resistors 85 and 86 form a voltage reference applied to the negative input terminal of amplifier 84, the value of which is chosen such that only a predetermined amplitude of the 4.4 micrometer radiation (i.e., a threshold level) will cause amplifier 84 to provide a logic output '1' signal on output conductor 82. In the preferred embodiment, resistors 85 and 86 have a value of 100 K-ohm and 1.8 K-ohm respectively and were precision resistors. The function of the energy discriminator circuit 80 is to prevent activation of the suppressant circuit in the event, for example, a relatively small flame such as one encountered in lighting a cigarette or the like is seen by the sensor. In the event the flame is sufficiently large, however, to have an apparent energy level exceeding the threshold, circuit 80 will provide a logic output '1' signal applied to the logic circuit 60.

Thus the operation of the energy discriminator and slope detector circuits each provides a logic output signal on conductors 82 and 72 respectively in the event a predetermined threshold of a hydrocarbon fire is detected and the amplitude is increasing at a predetermined rate respectively. These signals are applied to input terminals 8 and 6 respectively of a four input NAND gate 64 included in the logic circuit 60.

It was discovered that false alarms could occasionally be generated by a rapidly decreasing apparent temperature in which no significant hydrocarbon fire is detected. Thus, for example, if a HEAT round and associated pyrophoric reaction causes the slope detector and energy discriminator circuits to each output a logic '1' to the logic circuit 60; the temperature of the scene viewed could drop below approximately 1600° K. before the slope detector and energy discriminating circuit changed state back to '0'. In such event even though no hydrocarbon fire was detected, the inputs to logic circuit 60 would be at the logic '1' level causing a false alarm. In order to prevent such false alarm and especially in the presence of a HEAT round, output 55 of the color temperature discriminating circuit 50 is coupled to the input terminal line of NAND gate 64 through a unique sensing and delay circuit now described.

It is initially noted that in the event a HEAT round causes a hydrocarbon fire, it has been discovered that the temperature detected by the temperature sensing circuitry will drop below the 2400° K. level in less than one millisecond. This is believed to be due to the fact that the hydrocarbon fire actually quenches the pyrophoric reaction caused by the HEAT round. The quenching action typically lowers the temperature within less than 0.50 milliseconds of the initial HEAT round entry. This fact makes it possible to provide a sensing and discriminating circuit for deactivating the alarm system in the presence of a HEAT round by sensing the length of time that the apparent source temperature remained above 2400° K. If it remains above 2400° K. for, say, 1 millisecond, then one can say that is has not been quenched by a hydrocarbon fire, and the system can be deactivated for a brief time to prevent any false alarms which might result from the HEAT round explosions.

The sensing circuit includes a first delay circuit having an RC integrator including resistor 61 coupled to the output 55 of circuit 50 at one end and its remote end coupled to a NOR gate 62 coupled as an inverter. The junction of resistor 62 and gate 61 is coupled to the −V voltage supply through a capacitor 63. The time constant of resistor 61 and capacitor 63 is selected to be about one millisecond, and in the preferred embodiment, the resistor has a value of 100 K-ohm while capacitor 63 has a value of 0.01 microfarads. If the detected temperature is above about 2400° K. for more than 1 millisecond, thereby providing a logic '0' output at terminal 55 for more than 1 millisecond, capacitor 63 discharges significantly dropping the input to gate 62 to a logic '0'. Gate 62 has an output terminal 14 coupled to an inverter 65 such that the '0' applied to the input of gate 62 causes a '0' output 15 of inverter 65.

As a result, the diode connected to output 15 of inverter 65 becomes forward biased and the signal on input 9 of gate 64, which is normally logical '1' becomes logical '0'. Gate 64 is thus inhibited. Even when the signal on output 15 of inverter 65 returns to logical '1', input 9 of gate 64 remains at logical '0' for a period of time depending upon the values of resistor 67 and capacitor 68. In the preferred embodiment, this period of time is approximately 20 milliseconds. In the preferred embodiment resistor 67 has a value of 2.2 M-ohm while capacitor 68 has a value of 0.01 microfarads.

Thus it is seen that the input terminal pin 9 of gate 64 will normally be held at a logic '1' level and the logic '0' will be applied to disable the gate 64 on pin 9 only in the event that the color temperature detected exceeds 2400° K. for a period greater than 1 millisecond. A direct inhibit upon gate 64 will be provided on line 55 during all of the time that the source temperature is actually above 2400° K. This will occur only in the event a HEAT round is received which does not provide a hydrocarbon fire. In the event a HEAT round causes a hydrocarbon fire, the output from conductors 72 and 82 will be at a logic level '1' as will be the output terminal 55 after about one-half of a millisecond to cause gate 64 to respond providing a logic '0' output at pin 10. If a hydrocarbon fire is caused for any other reason, the output of the color detecting circuit 50 will be a logic '1' as will be the output conductors 72 and 82 of the 4.4 micrometer sensing channel. Activation of gate 64 will provide a logic output '0' applied to the suppressant activator circuit 100 through a diode 69. Similar diodes associated with the other inputs 102 and 104 form an OR gate for actuation of circuit 100 by any of the sensor heads.

Circuit 100 includes a monostable multivibrator 106 normally in a stable condition with a logic '0' output therefrom. In the event a logic '0' is applied to circuit 106 from any of the logic circuits associated with one or more of the fire sensing heads, however, it changes state providing a logic 1l' output applied to one input terminal of NAND gate 108 for a predetermined length of time, $\tau$. The remaining input terminal NAND gate 108 is coupled to a monostable multivibrator 110 normally in a state such that it outputs a logic '1' to gate 108. Thus with both of its inputs at a logic '1', gate 108 applies a logic 10' output to a power amplifier 112 which applies current to the resistive suppressant activating element 114 typically remotely located from the circuit 100 as indicated by the dotted line surrounding the element.

In response to the relatively high current level applied to the activating element for the suppressant, it can either open circuit thereby firing the suppressant or short circuit still firing the suppressant but loading the activator circuit 100 excessively. In order to prevent damage to the suppressant activator circuit, a short circuit sensing circuit 116 is provided and can constitute, for example, a transistor biased to be non-conductive except under short circuit conditions. If a short occurs, the monostable multivibrator 110 receives a signal which causes its output to change from '1' to '0' for a predetermined period of time which is greater than $\tau$, thereby disabling power amplifier 112 through gate 108. Because the period of monostable multivibrator 110 is greater than that of monostable multivibrator 106, in the event of a short, power amplifier 112 will not be reactivated until another detection is indicated at the input of monostable multivibrator 106. Thus the activator circuit 100 also provides improved means for activating the suppressant control element 114.

The operation of the circuit of FIG. 3 can best be understood by reference to the voltage waveform diagrams of FIGS. 4, 5 and 6. The voltage waveforms *a-h* in FIGS. 4, 5 and 6 correspond to signals at similarly identified circuit points of FIG. 3 for the particular operation described below.

Figures 4A, 4B, 4C, 4D, 4E, 4F, 4G, 4H:
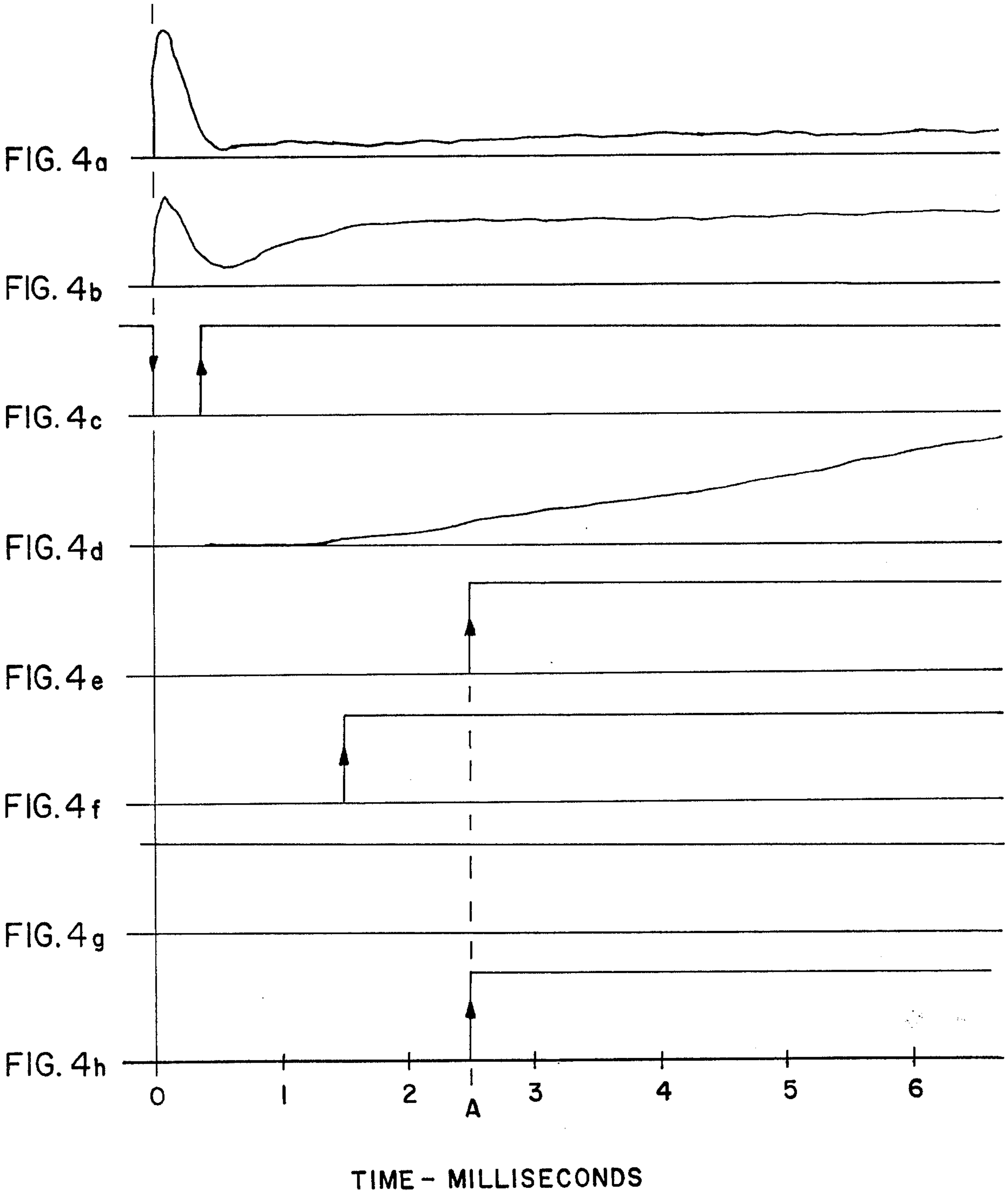
FIGS. 4*a*–4*h*, 5*a*–5*h* and 6*a*–6*h* are voltage waveform diagrams at various locations of the circuit of FIG. 3 under different operating conditions.

Referring initially to FIGS. 3 and 4, one possible mode of operation occurs when a fixed HEAT round penetrates both the armor plating and a full fuel tank, causing an explosive fire. For this event, both signal voltages 4*a* and 4*b* are rapidly increasing in amplitude. Because the initial apparent optically sensed temperature is greater than 2400° K., the voltage amplitude of FIG. 4*a* is greater and output of NAND gate 59 becomes a logic '0' of FIG. 4*c*, which inhibits NAND gate 65, preventing an output signal. Within 200 microseconds this high temperature flash is cooled below 2400° K. by the fuel from the tank and NAND gate 59 returns to a logic '1'.

Simultaneously, the explosive fire causes the slowly rising signal voltage of FIG. 4*d* which corresponds to an expanding flame front. Both signal inputs to amplifiers 74 and 84 have met the conditions of increasing amplitude and sufficient amplitude to produce, respectively, the waveforms of FIGS. 4*e* and 4*f*.

Additionally, the less than 1 millisecond duration of the initial flash is too short to activate NOR gate 62 and the voltage waveform of FIG. 4*g* is unchanged. In response to these signal voltages, the voltage waveform of FIG. 4*h* at point A results, activating the monostable multivibrator 106 which, with its associated circuitry, provides a signal to trigger the fire suppression mechanism. Since only signals caused by optical radiation are used to determine the presence of a fire, the circuit of this invention does not require the use of possibly misleading and arbitrary time delays to inhibit the instantaneous detection of an explosive fire. Also, the signal information used to prevent false detection is uniquely derived from the optical radiation signals.

Figures 5A, 5B, 5C, 5D, 5E, 5F, 5G, 5H:
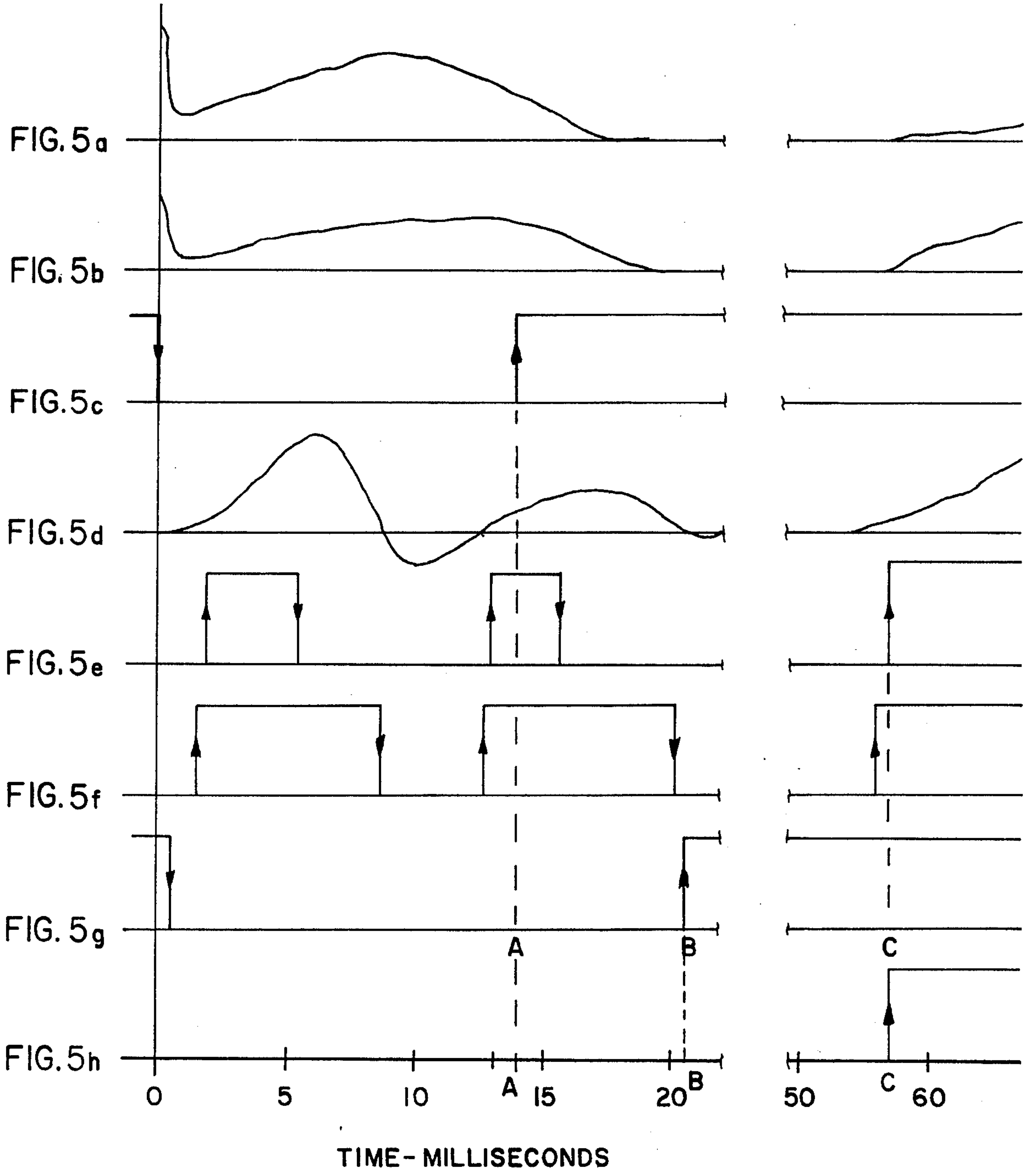
Figures 6A, 6B, 6C, 6D, 6E, 6F, 6G, 6H:
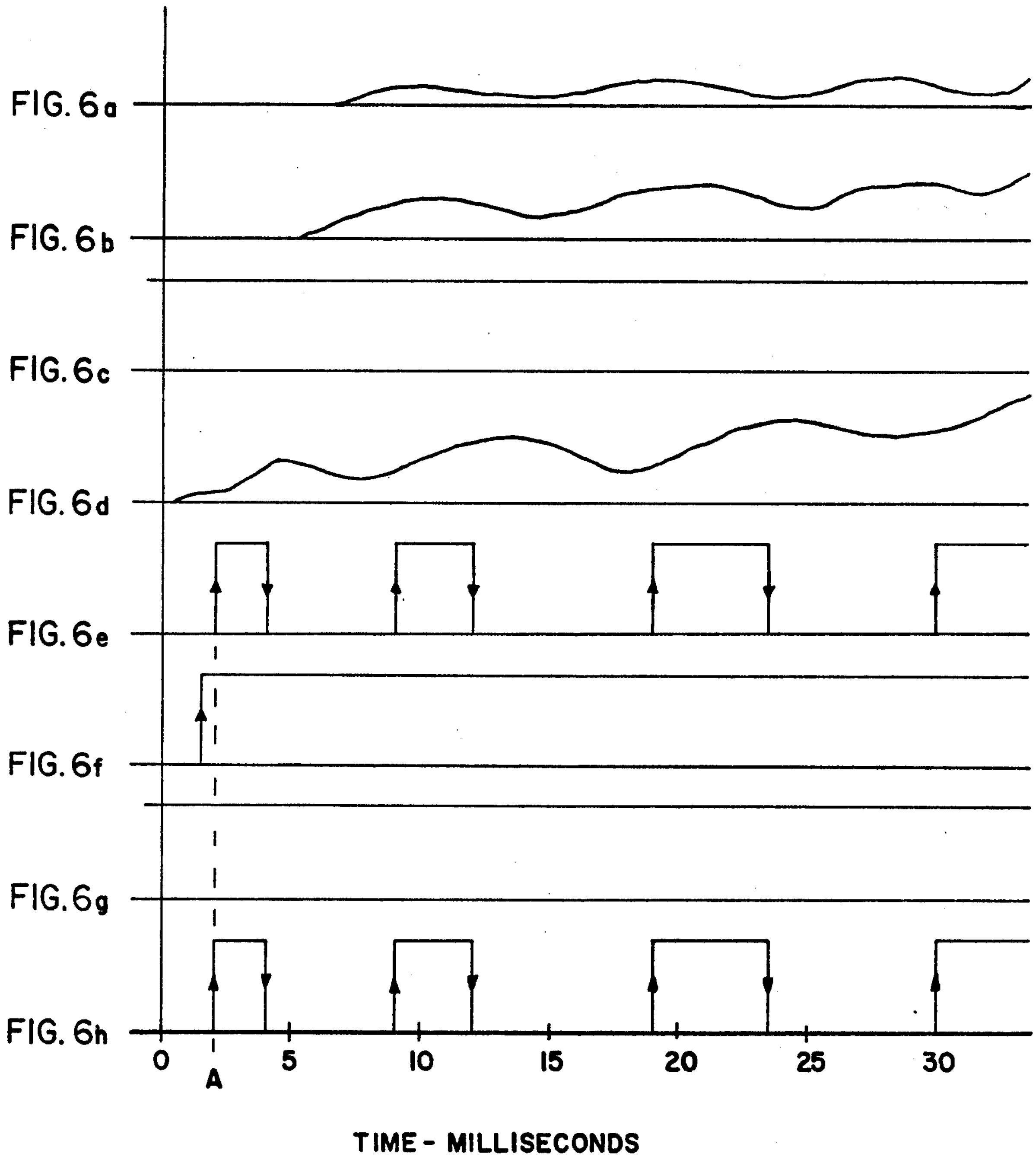

Another possible situation exists where the fired HEAT round misses the full fuel tank completely and does not cause a fire. For this condition it is important, of course, to prevent an output trigger signal from NAND gate 65 of FIG. 3. For this event, both signal voltages at points *a* and *b* in FIG. 3 and shown as waveforms in FIGS. 5*a* and 5*b* rise rapidly, remaining at amplitudes indicating an apparent optical temperature much greater than 2400° K.; resulting in a logic '0' output from NAND gate 59, whose waveform is indicated in FIG. 5*c*, preventing NAND gate 65 from producing an output trigger irrespective of what the other waveforms may indicate.

Additionally, the burning combustion products contained in the explosive round produce high temperature carbon dioxide, $CO_2$, emissions sensed by detector 32 of FIG. 3. The slowly rising voltage waveform in FIG. 5*d* corresponds to this initial high energy reaction. In response to this signal voltage the waveforms of FIGS. 5*e* and 5*f* results. However, during this first time interval, these last two signals are ineffectual in contributing to an output trigger because of the logic '0' signal from NAND gate 59 of FIG. 5.

Furthermore, the high energy input causes a charge to accumulate on capacitor 38 which is discharged through resistor 41. This discharge corresponds to the negative and second positive portion of the waveform in FIG. 5*d*. In the event that the apparent optical temperature decreased below 2400° K. and the previously mentioned resistor-capacitor network has not stabilized, a false trigger at a time indicated by point A of FIG. 5 would activate the fire suppression or control mechanism.

Now the importance of the signal voltage at point g of FIG. 3 is fully apparent. The potential false trigger is prevented because the signal voltage from NAND gate 59 persisted for more than 1 millisecond and caused NOR gate 62 to activate a 20 millisecond long logic '0' pulse shown in FIG. 5*g*.

A third situation occurs where the ammunition round explodes outside the fuel tank and causes a fire to occur at some later time. Either fragments of the vehicle armor or parts of the ammunition round could rupture the fuel tank and leaking fuel may subsequently ignite from hot debris caused by the ammunition round. The circuit of FIG. 3 will, in this situation, produce voltage signals to discriminate against the ammunition round explosion. After some time, the signal voltages return to a quiescent state and once again the presence of a fire can be detected which is indicated as point B in FIG. 5.

Further reference to the voltage waveforms of FIG. 5 are subsequent to the time indicated by point B. The signal voltages at points *a* and *b* of FIG. 3 will have respective waveforms of FIGS. 5*a* and 5*b*. The voltage waveforms of FIGS. 5*c* and 5*g* are unchanged because the apparent optical temperature sensed by detectors 12 and 22 of FIG. 3 is well below 2400° K.

The slowly increasing signal voltage at point *d* of FIG. 3 with waveform shown in FIG. 5*d* corresponds to an expanding diffusion fire. When the voltage amplitude at point *d* exceeds the predetermined level, amplifier 84 of FIG. 3 provides a logic '1' signal voltage at point *f*. When this expanding fire exceeds a predetermined rate of growth, amplifier 74 of FIG. 3 will also provide a logic '1' signal output voltage at point *e*. Voltage waveforms for these two conditions are indicated, respectively, in FIGS. 5*f* and 5*e*. In response to these signal voltages the voltage waveform of FIG. 5*h*, point C results; activating the fire suppression circuit.

Finally, it is possible for the sudden ignition of hydrocarbon vapors to cause a diffusion fire. This fire could be either a secondary result of an ammunition round or caused by some entirely independent event. As in the preceding situation, the signal voltage at points *a*, *b*, *c* and *g* of FIG. 3, whose waveforms are shown, respectively, in FIGS. 6*a*, 6*b*, 6*c* and 6*g*, are not used for detecting the fire. At the instant of ignition the volatile hydrocarbon vapors have reached the explosive limit and sufficient heat is available to ignite them. Detector 32 of FIG. 3 generates a signal voltage in response to the hot carbon dioxide gas produced in this ignition, and the amplified signal voltage at point *d* has the waveform shown in FIG. 6*d*. In response to this and other signals indicated as voltage waveforms in FIG. 6, the fire suppression or control mechanism is activated at the time indicated by point A of FIG. 6.

Visible light, caused by burning carbon particles, is not apparent during this early stage of the fire, and detection response time would be increased by several milliseconds in a system requiring visible confirmation of the fire. The selective sensing of carbon dioxide combustion products by the system of the present invention not only allows short detection times, but also provides a high degree of false alarm immunity. Thus, the sensing of optical radiation of gases caused by combustion is a significant feature of the present system.

It will become apparent to those skilled in the art that various modifications to the preferred embodiment of the invention described herein can be made without departing from the spirit and scope thereof as defined by the appended claims.

The embodiments of the invention in which an exclusive property or privilege is claimed are defined as follows.

1. A discriminating fire sensor comprising:
first circuit means for detecting the color temperature of a fire and providing an output signal indicating that the color temperature of a fire is above or below a predetermined level;
second circuit means for detecting the energy level of a hydrocarbon fire and for providing a control output signal when the detected level is above a predetermined threshold and increasing at a predetermined rate; and
logic circuit means coupled to said first and second circuit means and responsive to signals therefrom for providing a suppressant activating signal only in response to a control signal from said second circuit means and when the signal from said first circuit means indicates the color temperature of the fire is below said predetermined level.

2. The sensor as defined in claim 1 wherein said predetermined level is about 2400° K.

3. The sensor as defined in claim 2 wherein said first circuit means comprises a pair of detectors for detecting radiation at different wavelengths.

4. The sensor as defined in claim 3 wherein said first circuit means comprises a pair of detectors for detecting radiation at different wavelengths lying in the range of about 0.6 to 1.0 micrometers.

5. The sensor as defined in claim 4 wherein said pair of detectors includes a first detector for detecting radiation at wavelengths of about 0.76 micrometers and a second detector for detecting radiation at wavelengths of about 0.96 micrometers.

6. The sensor as defined in claim 5 wherein said second circuit means includes detection means for detecting radiation corresponding to $CO_2$ emissions.

7. The sensor as defined in claim 6 wherein said detection means detects radiation within a wavelength band centered at about 4.4 micrometers.

8. The sensor as defined in claim 7 wherein said logic circuit means includes a first delay circuit preventing generation of said suppressant activating signal for a predetermined period of time in the event the detected temperature exceeds about 2400° K. for a longer time than about one millisecond.

9. A discriminating fire sensor including detection means for providing control output signals indicating a fire having a predetermined temperature range and energy level range, wherein the improvement comprises: a logic circuit coupled to said detection means for providing a suppressant activating signal in the event a hydrocarbon fire is detected, said logic circuit further including a first delay circuit responsive to a signal from said detection means indicating a fire having a temperature above said predetermined temperature preventing generation of said suppressant activating signal for a predetermined period of time in the event the detected temperature exceeds said predetermined temperature for a time longer than about 1 millisecond.

10. The sensor as defined in claim 9 wherein said logic circuit includes gate circuit means having input terminals coupled to said detection means and to said first delay circuit and an output terminal for providing said suppressant activating signal thereat.

11. The sensor as defined in claim 10 and further including a second delay circuit employed from said first delay circuit to said gate circuit and responsive to an output signal from said first delay circuit for disabling said gate circuit means for a predetermined period of time.

12. The sensor as defined in claim 11 wherein said first delay circuit comprises an RC integrator circuit and a coupling diode for coupling said integrator circuit to said gate circuit means.

13. The sensor as defined in claim 12 wherein said second delay circuit comprises a parallel RC network coupled from the junction of said coupling diode to said gate circuit means to a source of potential for normally enabling said gate circuit means when said coupling diode is non-conductive.

14. For use in a fire suppressant system including a sensor circuit for developing a suppressant activation signal in the event a fire is detected and a resistive suppressant activator element actuated by the application of current therethrough, an improved suppressant activator circuit coupled from said sensor circuit to said activator element for providing short circuit protection, said activator circuit comprising:
a first latch circuit coupled to said sensor circuit for developing an output control signal in response to the receipt of a signal from said sensor circuit indicating a fire has been detected;
gate circuit means having a pair of input terminals and an output terminal wherein one of said input terminals is coupled to the output of said first latch circuit;
a power amplifier having an input terminal coupled to said output terminal of said gate circuit means and an output terminal coupled to said activator element for the actuation of the fire suppressant;
short circuit sensing means coupled to said activator element for detecting a short circuit condition;
second latch circuit means having an input terminal coupled to said short circuit sensing means and an output terminal coupled to the other input terminal of said gate circuit means, said second latch circuit normally providing an enabling signal to said gate circuit means but responsive to a signal from said short circuit sensing means in the event of a short in said activator element to change states to disable said gate circuit means thereby blocking current flow from said power amplifier.

15. The circuit as defined in claim 14 wherein said first and second latch circuit means are monostable multivibrators.

16. The circuit as defined in claim 15 wherein said gate circuit means is a NAND gate.

17. A method of developing an electrical signal representative of the temperature of a fire being above or below a predetermined temperature comprising the steps of:
sensing radiation at a first wavelength and providing a first electrical signal representative of its amplitude;
sensing radiation at a second wavelength and providing a second electrical signal representative of its amplitude; and processing said first and second electrical signals to provide an output control signal when said first and second signals indicate a source temperature above or below a predetermined level.

18. The method as defined in claim 17 wherein said first and second wavelengths lie within a range of about 0.6 to 1.0 micrometers.

19. The method as defined in claim 18 wherein said first wavelength is about 0.76 micrometers and said second wavelength is about 0.96 micrometers.

20. The method as defined in claim 17 wherein said processing step comprises the steps of:

attenuating the second electrical signal such that the amplitudes of the first and second signals are approximately equal when the two sensors view a source whose temperature is equal to a predetermined value;

providing a difference signal which is equal to the first signal minus the attenuated second signal; and providing an output control signal when the difference signal is greater than zero.

* * * * *

UNITED STATES PATENT AND TRADEMARK OFFICE

CERTIFICATE OF CORRECTION

PATENT NO. : 4,101,767

DATED : July 18, 1978

INVENTOR(S) : John W. Lennington, et al

It is certified that error appears in the above-identified patent and that said Letters Patent are hereby corrected as shown below:

Column 5; line 33:
"present" should be --preset--

Column 8; line 40:
"11'" should be --'1'--

Column 8; line 46:
"10'" should be --'0'--

Column 9; line 10:
"fixed" should be --fired--

Column 9; line 61:
"results" should be --result--

Signed and Sealed this

***Twentieth* Day of *March 1979***

[SEAL]

*Attest:*

RUTH C. MASON
*Attesting Officer*

DONALD W. BANNER
*Commissioner of Patents and Trademarks*